(12) United States Patent
Allison et al.

(10) Patent No.: US 6,819,932 B2
(45) Date of Patent: Nov. 16, 2004

(54) METHODS AND SYSTEMS FOR PREVENTING DELIVERY OF UNWANTED SHORT MESSAGE SERVICE (SMS) MESSAGES

(75) Inventors: Rick L. Allison, Apex, NC (US); Peter J. Marsico, Carrboro, NC (US)

(73) Assignee: Tekelec, Calabasas, CA (US)

( * ) Notice: Subject to any disclaimer, the term of this patent is extended or adjusted under 35 U.S.C. 154(b) by 69 days.

(21) Appl. No.: 09/915,968

(22) Filed: Jul. 26, 2001

(65) Prior Publication Data

US 2003/0083078 A1 May 1, 2003

Related U.S. Application Data

(60) Provisional application No. 60/273,439, filed on Mar. 5, 2001.

(51) Int. Cl.[7] .................................................. H04Q 7/20
(52) U.S. Cl. .................................... 455/466; 455/414.1
(58) Field of Search .......................... 455/466, 405, 455/406, 411, 410, 414.1, 418, 567, 433

(56) References Cited

U.S. PATENT DOCUMENTS

| 5,701,301 | A | * | 12/1997 | Weisser, Jr. ................. 370/428 |
|---|---|---|---|---|
| 5,742,905 | A | * | 4/1998 | Pepe et al. ................... 455/461 |
| 5,768,509 | A | | 6/1998 | Gunluk |
| 5,903,726 | A | | 5/1999 | Donovan et al. |
| 6,101,393 | A | | 8/2000 | Alperovich et al. |
| 6,108,559 | A | | 8/2000 | Astrom et al. |
| 6,175,743 | B1 | | 1/2001 | Alperovich et al. |
| 6,223,045 | B1 | | 4/2001 | Valentine et al. |
| 6,289,223 | B1 | | 9/2001 | Mukherjee et al. |
| 6,418,305 | B1 | * | 7/2002 | Neustein ..................... 455/406 |
| 2001/0005678 | A1 | | 6/2001 | Lee |
| 2001/0006897 | A1 | | 7/2001 | Kang et al. |
| 2001/0041579 | A1 | | 11/2001 | Smith et al. |

* cited by examiner

*Primary Examiner*—Erika Gary
(74) *Attorney, Agent, or Firm*—Jenkins, Wilson & Taylor, P.A.

(57) ABSTRACT

A signaling message processing and routing node transmits and receives short message service (SMS) data packets via a communications network. The routing node includes an SMS message discrimination module that determines whether an unwanted or spam SMS message is being sent to a receiving or called party. Unwanted SMS messages are discarded and consequently not delivered to their intended recipient. As a result, mobile subscribers and network nodes are shielded from unwanted SMS traffic. The SMS message discrimination module also includes a provisioning interface that allows end users and network operators to control SMS message discrimination criteria.

52 Claims, 9 Drawing Sheets

(PRIOR ART)

Figure 1

(PRIOR ART)

METHODS AND SYSTEMS FOR PREVENTING DELIVERY OF UNWANTED SHORT MESSAGE SERVICE (SMS) MESSAGES

RELATED APPLICATIONS

This application claims the benefit of U.S. provisional patent application No. 60/273,439 filed Mar. 5, 2001, the disclosure of which is incorporated herein by reference in its entirety.

TECHNICAL FIELD

The present invention relates to methods and systems for preventing the delivery of unwanted short message service (SMS) messages to a subscriber in a mobile communications network. More particularly, the present invention relates to methods and systems for intercepting and discarding unwanted SMS messages at an SMS message routing node, thereby preventing the delivery of unwanted SMS messages to an SMS subscriber.

BACKGROUND ART

Short message service, which was first introduced by European wireless network operators in 1991, enables mobile subscribers to easily send and receive text messages via a wireless handset. As the convergence of wireless communication networks and Internet data networks has increased, the sending and receiving of SMS messages via computer terminals has also become commonplace. Although specifications and industry standards related to SMS are constantly evolving and being modified, SMS messages have traditionally been used to convey readable text information, where the text can include any combination of alphanumeric characters. After the initial text messaging application, service providers began focusing on using SMS as a means of eliminating alphanumeric pagers by permitting two-way, general-purpose, messaging and notification services. One service that was provided was voice mail notification. As technology and networks continued to mature, a variety of services were introduced, including electronic mail (email) and fax integration, paging integration, interactive banking, and information services, such as stock quotes, news highlights, etc.

SMS delivery service provides a mechanism for transmitting "short" messages to and from SMS-capable terminals (e.g., wireless handsets, personal computers, etc.) via the signaling component of the wireless communication network. With particular regard to the sending and receiving of SMS messages by a wireless handset, a wireless network provides the transport facilities necessary to communicate short messages between a short message service center (SMSC) and a wireless handset. A short message service center functions as a store and forward platform for short messages. In contrast to earlier text message transmission services, such as alphanumeric paging, SMS technology is designed to provide guaranteed delivery of an SMS message to a destination. That is, if a temporary network failure prohibits the immediate delivery of an SMS message, then the short message is stored in the network (i.e., at an SMSC) until the destination becomes available. Another of the key and distinguishing characteristics of SMS service with respect to previously available message communication services is that an active mobile handset is able to receive or transmit a short message at any time, regardless of whether or not a voice or data call is in progress.

Figure 1:
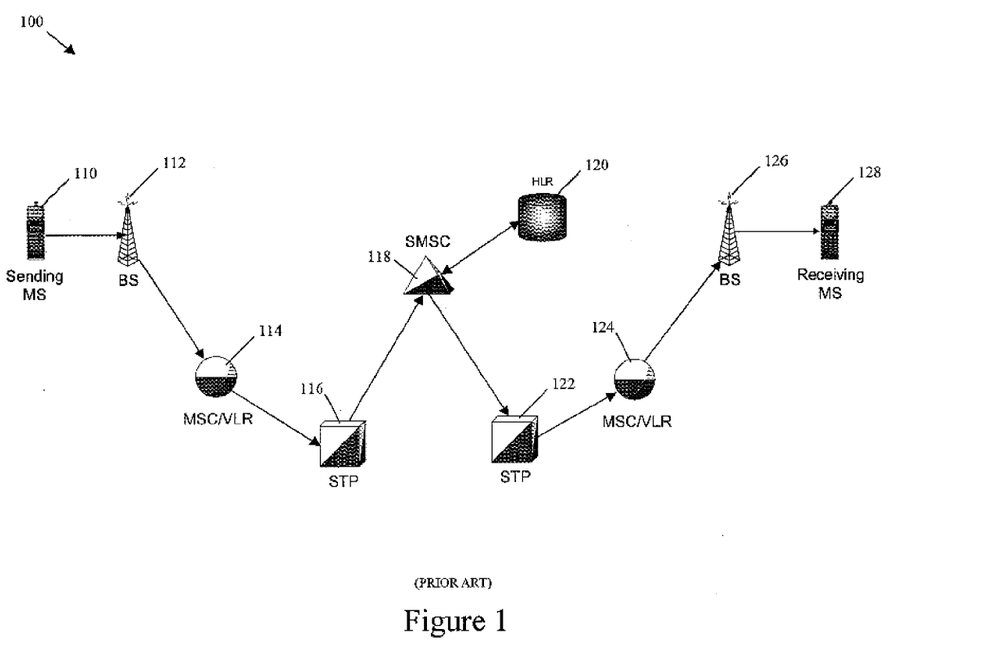
FIG. 1 is a network diagram illustrating mobile communications network elements associated with sending SMS messages originating from a mobile subscriber.

SMS can be characterized as an out-of-band packet delivery technique with low per-message bandwidth requirements. Hence, SMS services are appealing to network owners and operators. FIG. 1 is a network diagram illustrating an SMS implementation in a global system for mobile communications (GSM) wireless network. It will be appreciated that a functionally similar SMS architecture could also be employed in non-GSM wireless networks. In any event, FIG. 1 includes a wireless communication network, generally indicated by reference numeral 100. Wireless network 100 includes a sending mobile terminal 110 that formulates and sends an SMS message and a base station system 112 that manages the network-to-air interface and reliably transmits the SMS message into the core wireless network. In this particular example, the receiving end of the network includes a base station system 126 and a receiving mobile terminal 128. Wireless network 100 also includes a pair of mobile switching centers (MSCs) 114 and 124, a pair of signal transfer points (STPs) 116 and 122, a short message service center (SMSC) 118 and a home location register (HLR) 120.

As mentioned previously, SMSC 118 is responsible for relaying, storing, and forwarding short messages between sending and receiving SMS terminals. HLR 120 is a database platform used for permanent storage and management of mobile service subscriptions, mobile subscriber profiles, and mobile subscriber location information. HLR databases permanently store information about subscribers that belong to the same network as the HLR. A database element, known as a visitor location register (VLR), is used to temporarily store information about subscribers who are currently "roaming" in the area serviced by that VLR. The VLR may belong to the subscriber's home network or to a non-home network. Typically, VLR databases are integrated within MSC network elements, and, as such, an explicit VLR node is not shown in FIG. 1. The HLR and VLR store information needed to correctly route voice calls or data communications to the mobile subscriber. This may include international mobile station identification (IMSI), mobile identification number (MIN), mobile directory number (MDN), and mobile station international ISDN number (MSISDN), as well as the IDs of the VLR and MSC with which the subscriber is currently associated.

With particular regard to short message service operations, HLR 120 provides SMSC 118 with network routing information for the receiving mobile subscriber or mobile terminal 128. In certain cases, HLR 120 may also inform SMSC 118, which has previously initiated unsuccessful short message delivery attempts to a specific mobile station, that the mobile station is now recognized by the mobile network to be accessible.

MSC 114 is sometimes referred to as an SMS interworking MSC (SMS-IWMSC) because it is capable of receiving a short message from a wireless network and submitting it to the appropriate SMSC. In practice, SMS-IWMSC nodes are typically integrated with an MSC in the network but may also be integrated with the SMSC. In a similar manner, MSC 124 is sometimes referred to as an SMS gateway MSC (SMS-GMSC) because it is capable of receiving a short message from an SMSC, interrogating a home location register for routing information, and delivering the short message to the "visited" MSC of the recipient mobile station.

Figure 2:
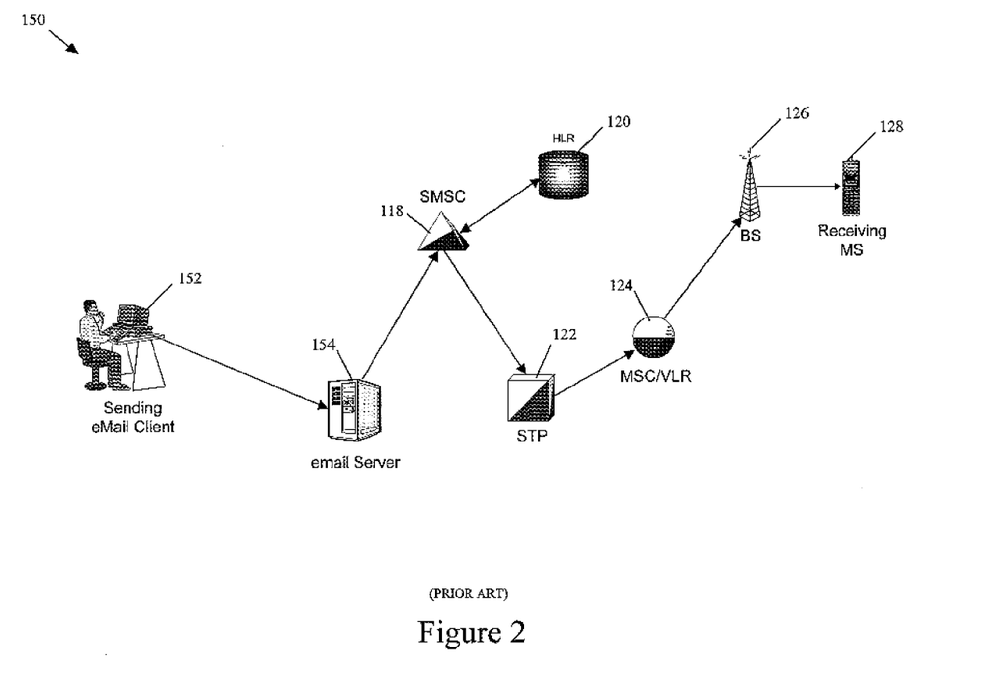
FIG. 2 is a network diagram illustrating network elements associated with sending an SMS message originating from an email client.

FIG. 2 illustrates a communications network 150, which is a variation of the wireless network 100 described above. In place of a sending base station system and sending wireless terminal, network 150 contains a sending email client 152 and an email server 154. Email server 154 formulates SMS messages based on email messages and forwards the SMS messages to SMSC 118. As such, an email message may be generated by a wireline computer terminal residing within a data network (e.g., the Internet) and sent to a mobile terminal within a wireless network as a SMS message.

The signaling infrastructure of wireless network 100 illustrated in FIG. 1 is based on signaling system no. 7 (SS7), a telecommunications industry standard signaling protocol. SMS service makes use of the SS7 mobile application part (MAP), which defines the methods and mechanisms of signaling communication in mobile or wireless networks. The MAP protocol utilizes the transaction capabilities application part (TCAP) component of the SS7 protocol. Both North American and international standards bodies have defined a MAP layer using the services of the SS7 TCAP component. The North American standard is published by Telecommunication Industry Association and is referred to as IS-41 MAP, while the international standard is defined by the European Telecommunication Standards Institute and is referred to as GSM MAP.

Figure 3:
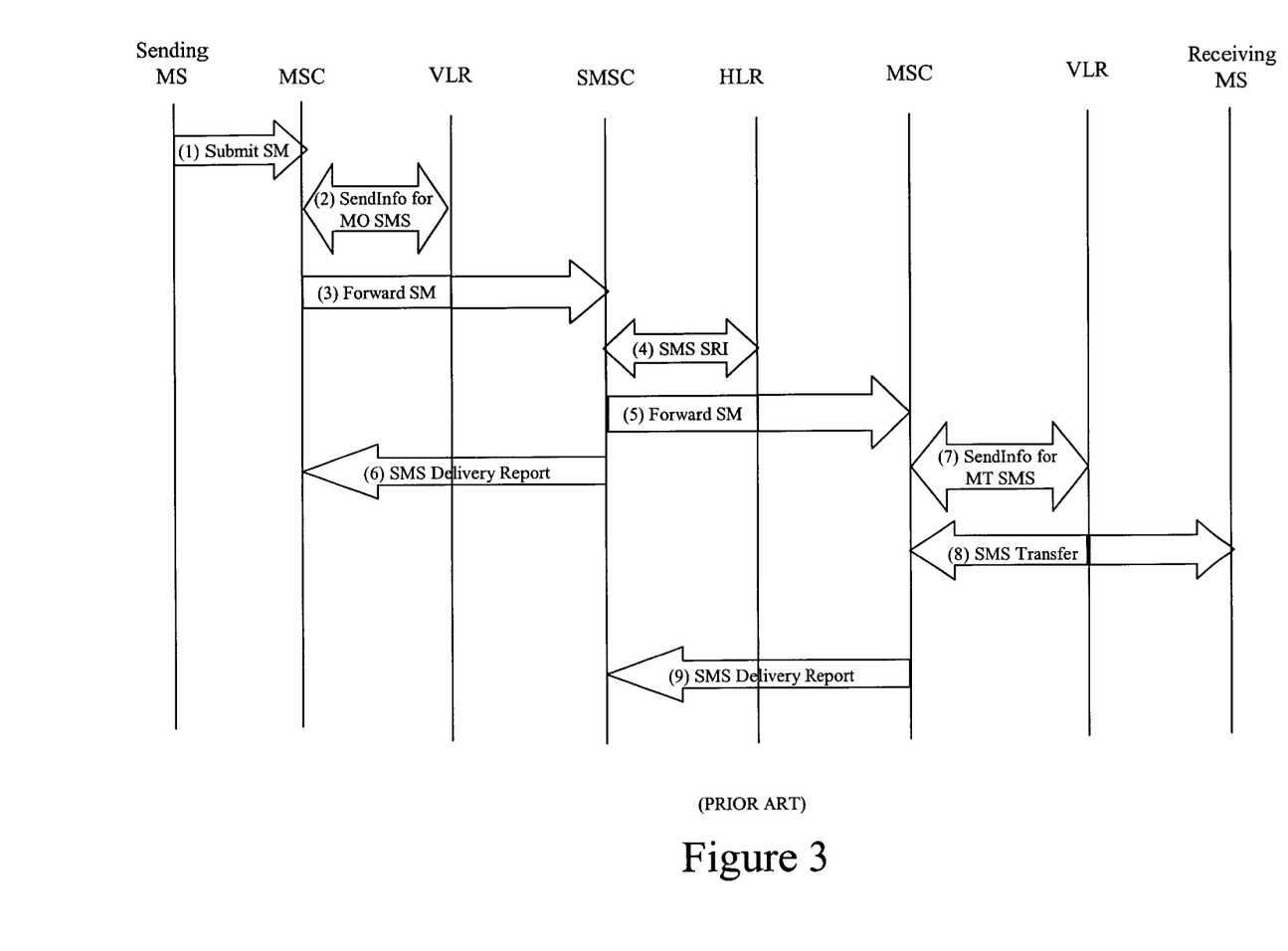
FIG. 3 is a message flow diagram illustrating messages transmitted between mobile communications network elements associated with originator and delivery of an SMS message.

FIG. 3 is a sample message flow diagram associated with the delivery of a short message (SM) to a mobile subscriber or terminal in GSM wireless network. This diagram assumes the IWMSC and the GMSC node are both integrated into the SMSC node. The messages illustrated in FIG. 3 are GSM MAP protocol messages. However, a similar call flow is used for the IS-41 MAP protocol. In step 1, a short message, such as a text message, is formulated by a sending mobile terminal and transmitted via a signaling network to an MSC node. In response to receiving the SM, the MSC formulates a MAP-SEND-INFO-FOR-MO-SMS query message and transmits the query message to the VLR node with which the MS is currently registered (step 2). The VLR responds to the query and, if the receiving mobile subscriber (MS) is registered, provides the MSISDN corresponding to the IMSI to the MSC. Upon receiving the MS information, the MSC transmits the short message in a MAP-MO-FORWARD-SHORT-MESSAGE message to the SMSC (step 3). The SMSC sends a MAP-SEND-ROUTING-INFO message to the HLR of the SMS recipient using the recipient's MSISDN (step 4). The HLR responds with the IMSI of the recipient and the MSC with which the IMSI is currently registered.

If the information received from the HLR indicates that the recipient is available (i.e., currently registered with an MSC and turned on with sufficient memory), the SMSC then transmits the short message to the MSC in a MAP-MT-FORWARD-SHORT-MESSAGE (step 5) and transmits a delivery report to the sending MSC (step 6). An SMSC attempts to deliver a short message to a receiving MS whenever the MS is registered and available (i.e., turned on with sufficient memory), even when the MS is engaged in a voice or data call. Such service is referred to as point-to-point delivery service and is accomplished via the use of the Short Message Delivery-Point-to-Point (SMD-PP) and ForwardShortMessage mechanisms in IS-41 and GSM, respecftively.

In step 7, the MSC queries the VLR with which the recipient is currently registered with a MAP-SEND-INFO-FOR-MT-SMS message. The VLR returns location information associated with the intended recipient (e.g., the MSISDN number for the intended recipient). Using the information obtained from the VLR database, paging and authentication operations are initiated between the MS and the base station. Once the receiving MS has been authenticated and located, the MSC transmits the short message to the mobile (step 8). In step 9, information associated with the disposition or status of the SMS delivery attempt is returned to the SMSC.

It will be appreciated that such delivery status information may be used by the SMSC to ensure or guarantee the delivery of a particular message. That is, when a short message delivery attempt by the SMSC fails due to a temporary network failure, the SMSC requests that it be notified by the HLR when the indicated mobile subscriber becomes accessible. Such message waiting functionality is achieved via the use of the SMS notification indicator and set message waiting data mechanisms in IS-41 and GSM, respectively.

From the discussion of SMS operation fundamentals presented above, it will be appreciated that the SMS components of a wireless communication network will diligently attempt to deliver every SMS message that is received by the network. While such guaranteed delivery service is an attractive feature or attribute of SMS system operation, the delivery of each and every SMS message addressed to a particular subscriber may not always be desirable. As the popularity of portable wireless communication devices (e.g., mobile telephones, hand-held computing devices, etc.) continues to rise, it is anticipated that SMS messaging may become widely used as a retail advertising medium. As such, SMS subscribers may find themselves the constant target of unwanted SMS messages, often referred to as "spam" or "junk" messages. Spam SMS messages may be annoying to mobile subscribers. In addition, from a network operations perspective, large volumes of spam SMS messaging traffic has the potential to severely impact overall network performance. In any event, there exists a need for novel methods and systems for preventing the delivery of unwanted SMS messages to a mobile subscriber and also to eliminate such unwanted SMS message traffic from an operator's network so that valuable network resources (e.g., SMSCs, HLRs, VLRs, etc.) are not burdened by spam SMS message traffic.

DISCLOSURE OF THE INVENTION

According to one aspect, the present invention includes a signaling message routing node that transmits and receives short message service (SMS) data packets via a communications network. The routing node includes an SMS message discriminator (MD) database that contains information used to determine whether a received SMS message is wanted by a called or receiving party. The MD database includes data used to identify a sending and/or receiving party attribute of an SMS message, as well as discrimination processing instructions. Such discrimination processing instructions may include an indicator that directs an SMS message to be discarded (i.e., not delivered to the intended addressee) or an indicator that directs an SMS message to be routed normally (i.e., delivered to the intended addressee). An SMS message generation module may generate a new SMS message addressed to the sending or calling party associated with a discarded message. This new SMS message may notify the sending or calling party that delivery of the discarded SMS message was unsuccessful.

The SMS message discrimination module of the present invention may also examine sending party, calling party, and/or routing information contained in an SMS message received to determine the source of a repeat SMS spam originator. As such, it may be possible for an SMS message discrimination module of the present invention to identify the particular network, network elements, or communication terminal(s) from which spam SMS messages are being originated or staged. If the origin of such spam SMS messaging can be determined, a new SMS message can be generated to notify one or more network operators of the incident so that appropriate steps can be taken to eliminate the spam SMS originator's access to an operator's network and network resources (e.g., SMSCs, HLRs, VLRs, MSCs, etc.).

Accordingly, it is an object of the present invention to allow a short message service subscriber to specify from which calling or sending parties SMS messages will be received.

It is another object of the present invention to allow a short message service subscriber to specify from which calling or sending parties SMS messages will not be received.

It is another object of the present invention to prevent a short message service subscriber from receiving unwanted or spam type SMS messages.

It is another object of the present invention to provide a network routing node that facilitates the enforcement of spam SMS message elimination measures.

It is another object of the present invention to provide a network routing node that prevents wireless network resources (e.g., SMSCs, HLRs, VLRs, MSCs, etc.) from being burdened with the processing of spam SMS messages.

It is another object of the present invention to notify the sending or calling party of an SMS message associated with an SMS spam message that the offending spam SMS message has been discarded.

It is another object of the present invention to notify a network operator of the occurrence of a spam SMS message so that steps may be taken by the operator to prevent further spam SMS message traffic from the spam SMS message originator.

Some of the objects of the invention having been stated hereinabove, other objects will be evident as the description proceeds, when taken in connection with the accompanying drawings as best described hereinbelow.

BRIEF DESCRIPTION OF THE DRAWINGS

A description of the present invention will now proceed with reference to the accompanying drawings of which.

DETAILED DESCRIPTION OF THE INVENTION

Figure 4:
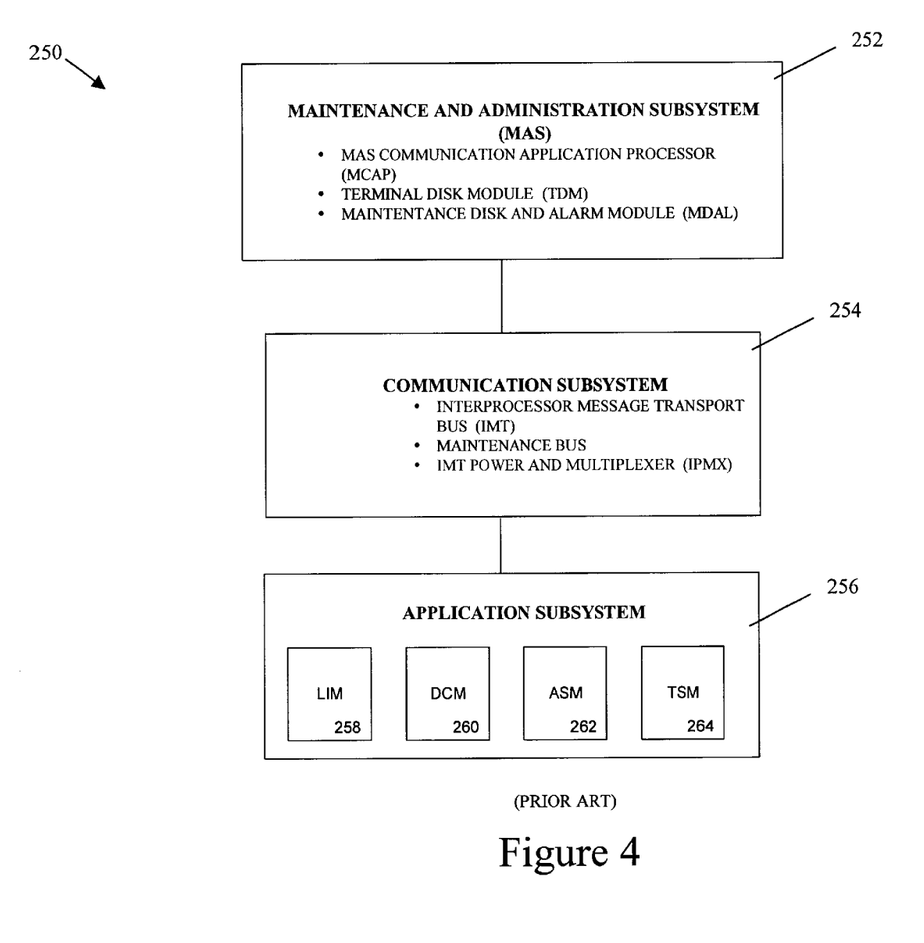
FIG. 4 is a block diagram of a signaling gateway routing node having an underlying hardware platform suitable for use with embodiments of the present invention.

According to one embodiment, the present invention includes a routing node having an SMS message discrimination module. Such a routing node may include an internal architecture similar to that of high performance signal transfer point and SG products marketed by Tekelec of Calabasas, California as the EAGLE® STP and IP7™ SECURE GATEWAY, respectively. A block diagram that generally illustrates the base internal architecture of the IP7™ SECURE GATEWAY product is shown in FIG. 4. In FIG. 4, a signaling gateway 250 includes the following subsystems: a maintenance and administration subsystem (MAS) 252, a communication subsystem 254 and an application subsystem 256. MAS 252 provides maintenance communications, initial program load, peripheral services, alarm processing and system disks. Communication subsystem 254 includes an interprocessor message transport (IMT) bus that is the main communication bus among all subsystems in signaling gateway 250. This high-speed communications system includes two 125 Mbps counter-rotating serial rings.

Application subsystem 256 includes application cards or printed circuit boards that are capable of communicating with the other cards through the IMT bus. Numerous types of application cards can be incorporated into SG 250, including: a link interface module (LIM) 258 that communicates with external SS7 links and X.25 links, a data communication module (DCM) 260 that provides an Internet protocol (IP) interface using transmission control protocol (TCP), and a translation services module (TSM) 262 that provides global title translation, gateway screening and other services. A database services module (DSM) 264 is also provided to support triggered local number portability service as well as advanced database services, such as the SMS spam control application described herein.

SMS Message Discrimination and Routing Node Architecture

Figure 5:
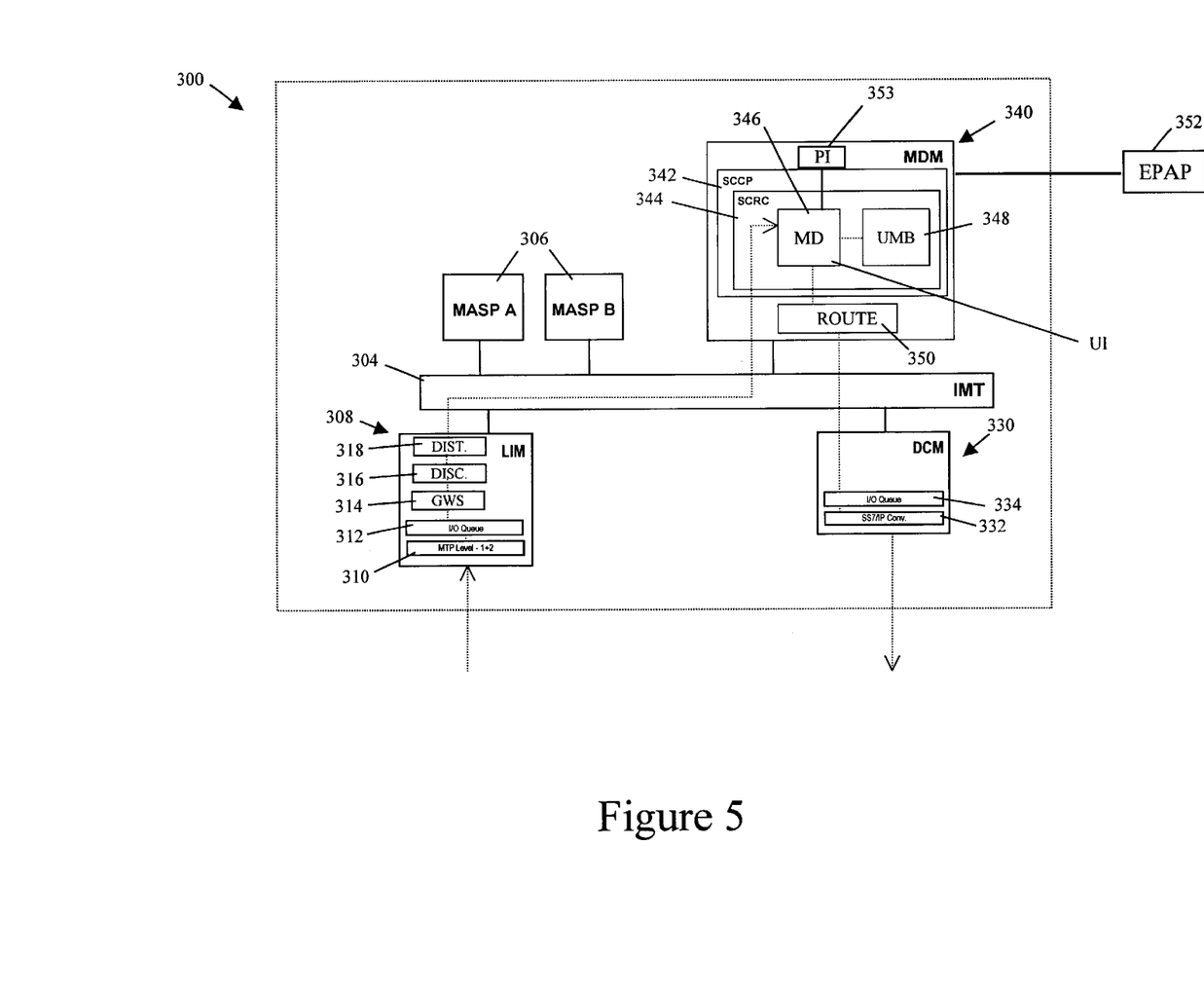
FIG. 5 is a schematic diagram of a signaling gateway routing node including an SMS message discrimination module (MDM) according to an embodiment of the present invention.

FIG. 5 illustrates a signaling gateway 300 including an SMS message discrimination module according to an embodiment of the present invention. In FIG. 5, SG 300 includes an interprocessor message transport bus 304 that is the main communication bus among all internal subsystems within switch or routing node. As stated above, IMT bus 304 may include two 125 Mbps counter-rotating serial rings. A number of cards or processing modules may be coupled to IMT bus 304. These cards or processing modules include a pair of maintenance and administration subsystem processors (MASPs) 306, an SS7-capable link Interface module 308, an IP-capable data communication module 330, and an SMS message discrimination module (MDM) 340. These modules may be physically connected to IMT bus 304 such that signaling and other type messages may be routed internally between all active cards or modules. As used herein the term "module" can include a hardware component, a software component, or a combination of hardware and software components. For example, a module may be a chip, such as an ASIC, designed to perform a specific function. Alternatively, a module may be a part of a computer program that performs a specific function. In yet another alternative, a module may be a microprocessor programmed to perform a specific function.

For simplicity of illustration, only single LIM, DCM, and MDM cards are included in FIG. 5. However, it should be appreciated that the distributed, multi-processor architecture of the SG node 300 facilitates the deployment of multiple LIM, DCM, MDM and other cards, all of which could be simultaneously connected to and communicating via IMT bus 304.

MASP pair 306 provide maintenance communications, initial program load, peripheral services, alarm processing and system disks. As the MASP pair are not particularly relevant to a discussion of SMS message discrimination application functionality, a detailed discussion of their design and operation is not provided herein.

Focusing now on LIM card functionality, in the illustrated embodiment LIM 308 is comprised of a number of sub-components including: an SS7 MTP level 1 and 2 process 310, an I/O buffer or queue 312, a gateway screening (GWS) process 314, an SS7 MTP level 3 discrimination process 316, and a distribution process 318. MTP level 1 and 2 process 310 provides the facilities necessary to send and receive digital data over a particular physical medium. MTP level 1 and 2 process 310 also performs error detection, error correction and sequenced delivery of SS7 message packets. I/O queue 312 provides for temporary buffering of incoming and outgoing signaling message packets. GWS process 314 examines received message packets and determines whether the messages should be allowed into the switch for processing and/or routing. Discrimination process 316 performs a discrimination function, effectively determining whether an incoming SS7 message packet requires internal processing or is simply to be through-switched, i.e., routed to another node. In one embodiment, discrimination process 316 examines a service indicator octet (SIO) value in the received message packet in order to determine whether internal SCCP-type processing is required. Distribution process 318 handles the internal routing of SS7 message packets that require additional processing prior to final routing.

DCM 330 shown in FIG. 5 includes an SS7/IP converter 332 that converts between SS7 and IP protocol stacks. An I/O queue 334 buffers inbound and outbound messages. Outgoing SS7 message packets routed through DCM 330 will be transmitted from SG node 302 and into an IP network. The message packets received and transmitted by a DCM card may include messages formatted according to the transport adapter layer interface (TALI), session initiation protocol (SIP), M2UA, M3UA, SUA, SCTP, H.323 or other signaling protocols that utilize TCP/IP, UDP/IP, or IP.

An SMS message discrimination module according to an embodiment of the present invention may include an SMS message discrimination application and an SMS message discrimination database for processing unwanted SMS messages. In FIG. 5 MDM 340 includes a signaling connection control part (SCCP) sub-module 342. SCCP sub-module 342 includes an SMS message discrimination application subsystem controller known as a signaling connection routing controller (SCRC) 344. Responsibilities of the SCRC 344 include directing incoming SS7 messages to an SMS message discrimination application 346 and creating new message packets in response to information returned by the discrimination application 346. SS7 message packets leaving SCRC 344 are received and further processed by a routing application 350. Routing application 350 is responsible for the external routing of SS7 message packets that have been processed by the MD application 346 and/or do not require additional processing by signaling gateway routing node 300. That is, routing application 350 determines to which LIM or DCM card an SS7 message packet should be routed for subsequent outbound transmission from the SG node. It will also be appreciated from FIG. 5 that in one embodiment MDM 340 is coupled to and serviced by an external provisioning application platform (EPAP) subsystem 352 via an Ethernet connection. EPAP subsystem 352 is responsible for administration and maintenance of MDA data resident on MDM 340.

Exemplary SMS Message Discrimination Module Architecture

As discussed previously, a significant problem associated with currently offered SMS type services involves an SMS recipient's inability to control the flow of SMS messages to his or her communication terminal. This shortcoming has the potential of becoming greatly amplified as the generation of SMS type message traffic outside of the traditional PSTN network environment continues to increase. As such, one object of a routing node including an SMS message discrimination module according to an embodiment of the present invention is to provide a method by which a network operator can quickly and easily control which SMS type messages are delivered to an SMS service subscriber. It will be further appreciated that a network operator may also provide an individual SMS subscriber with the ability to directly control which SMS type messages are delivered to his or her communication terminal by granting the SMS subscriber indirect access to the MDA data.

In the embodiment illustrated in FIG. 5, SMS message discrimination application 346 includes a provisioning interface 353 that allows external access to SMS message discrimination data. Provisioning interface 353 may be any type of interface suitable for altering SMS message discrimination data. Examples of such interfaces may include text-based interfaces, graphical interfaces, or interfaces that include both textual and graphical components. Interface 353 may be accessed using any suitable means, such as using HTTP or FTP via the Internet.

MDM 340 includes one or more data tables that contain information used to implement the SMS message discrimination functionality described above. Table 1 shown below illustrates exemplary information that may be used for spam SMS message discrimination in a communications network according to an embodiment of the present invention. The message discrimination table structure depicted in Table 1 is presented for purposes of illustration. A practical implementation of a message discrimination application of the present invention may include a more complex data structure than a simple table, such as a tree structure.

TABLE 1

SMS Message Discrimination Data

| KEY (s) | | | | | DATA |
|---|---|---|---|---|---|
| Rcvg Pty | Sending Pty | OPC | DPC | CID | Disc. Action |
| 9194605500 | * | * | * | * | Reject |
| 9194691300 | * | * | * | * | Allow |
| 9193802000 | 9194690000 | * | * | 321 | Reject |
| snd@aol.com | 9194605500 | * | 1-1-1 | * | Reject |

TABLE 1-continued

SMS Message Discrimination Data

| KEY (s) | | | | | DATA |
|---|---|---|---|---|---|
| Rcvg Pty | Sending Pty | OPC | DPC | CID | Disc. Action |
| * | spam@aol.com | * | 2-2-2 | 221 | Allow |

In any event, the sample data structure shown in Table 1 contains a number of key or index fields including: a receiving or called party identification field, a sending or calling party identification field, an originating point code field, a destination point code field, and a carrier identification field. In a signaling system 7 signaling environment, SMS message discrimination data that may be stored in the sending or calling party identifier field includes a calling party address parameter, a sender's mobile station integrated services digital network number, a sender's international mobile station identifier number, or a sender's mobile identification number. Sending party field may also store SIP identifiers, such as directory numbers and email addresses used to screen SIP-based SMS messages.

Parameters extracted from a received SMS message may be compared with the values stored in the sending party field to select an SMS message discrimination action. For example, a calling party address value extracted from the SCCP portion of an SMS message may be compared with the values stored in the sending party identifier field to select an SMS discrimination action. Alternatively, or in addition to screening based on extracted SCCP parameters, extracted MAP parameters, such as MSISDN, IMSI, and/or MIN, may be used for SMS message discrimination. Still another value that may be extracted from a received SMS message and compared to values in the sending party field includes a SIP identifier extracted from the FROM field of a SIP message.

The receiving party field in Table 1 may include SCCP called party address parameters, MAP-based called party identifiers, and/or SIP-based called party identifiers. These receiving or called party identifiers may be used to compare to the corresponding parameters in a received SMS message in selecting an SMS discrimination action.

The OPC, DPC, and CID parameter fields in Table 1 may be used to screen unwanted SMS messages either alone or in combination with other fields. For example, the OPC field may be used to screen SMS messages originating from a particular node, such as an MSC or an end office associated with a particular spam message originator. The DPC field may identify a node at which a recipient does not desire to receive SMS messages. For example, an SMS message recipient may not desire to receive SMS messages on a business telephone. This could be accomplished by provisioning the end office or MSC associated with the intended recipient's mobile or landline business telephone. The carrier ID field may be used to determine whether a particular carrier has an SMS message discrimination agreement with the owner of the routing node containing the SMS discrimination application.

In Table 1, each entry or record contains an SMS discrimination action field. The SMS message discrimination action field may store SMS message processing instruction information. Each entry defines a rule for processing one or more SMS messages, where, in the simplest of scenarios, a received SMS message is either "allowed" or "rejected." If SMS discrimination indicates that a received SMS message is to be "allowed," then the message is routed normally through the network to the intended recipient. If, however, SMS discrimination indicates that the message is to be "rejected," the message is discarded at the routing node by the MDA.

Using a table-driven architecture to perform SMS message discrimination greatly facilitates provisioning and updating SMS message discrimination data. A network operator can provision the SMS message discrimination table with an initial set of discrimination parameters, such as known sources of spam SMS messages. As new sources become known, the SMS message discrimination module can be updated simply by modifying or adding entries to the SMS message discrimination table. There is no need to modify the SMS message discrimination module hardware or software. Since no software modification is needed, SMS discrimination can be updated without the services of a skilled programmer to modify and re-compile the software.

Provisioning interface 353 illustrated in FIG. 5 may be used to modify one or more fields in Table 1. For example, if the user is a mobile telecommunications subscriber, the user may provision his or her IMSI or MSISDN number in the called party number field and one or more parameters associated with an unwanted SMS message in the remaining fields of Table 1. Alternatively, if the user is a network operator, the network operator may provision a value in originating point code field if the network operator has knowledge of a switch that originates a large quantity of spam SMS messages. As stated above, the user interface may be remotely accessible over a computer network, such as the Internet.

Again, it should be appreciated that the message discrimination table record structures and pseudo data presented in Table 1, while supportive of the examples presented in this disclosure, is merely illustrative of the basic information necessary to provide the required SMS message discrimination functionality. In practice, the actual record structures and overall database design may vary according to particular implementation and system performance requirements.

In one embodiment, message discrimination module 340 includes a usage measurements and billing (UMB) database 348 that maintains information associated with screened or processed messages in the form of call detail records (CDRs). A simplified example of such call detail records is presented in Table 2.

TABLE 2

Usage Measurements and Billing Data

| KEY | | BILLING RECORD DATA | | |
|---|---|---|---|---|
| Date | Time | Recv. Pty | Sending Pty | Carrier |
| 12/01/2000 | 13:01:24 | 9194691300 | 9194671100 | 221 |
| 12/01/2000 | 13:01:26 | 9193457012 | joe@aol.com | 636 |
| 12/01/2000 | 13:01:34 | 9193457894 | 9194671230 | 221 |

Each row in Table 2 represents a CDR. Each CDR includes date and time key fields. Each CDR also includes a called or receiving party identifier field that contains a phone number or similar identifier (e.g., email address, URL, etc.) associated with the SMS receiving party, a calling or sending party identifier field that contains the phone number or similar identifier (e.g., email address, URL, etc.) associated with the SMS sending party, and a carrier ID field 368 that contains the carrier ID associated with the SMS message. UMB database 348 may also collect store peg count type usage measurements and statistics associated with screened or processed SMS messages. Such information may be used to generate usage reports, billing verification reports, and bills associated with SMS messages that are processed by the SMS message discrimination system.

SMS Message Discrimination Module Operation

Figure 6:
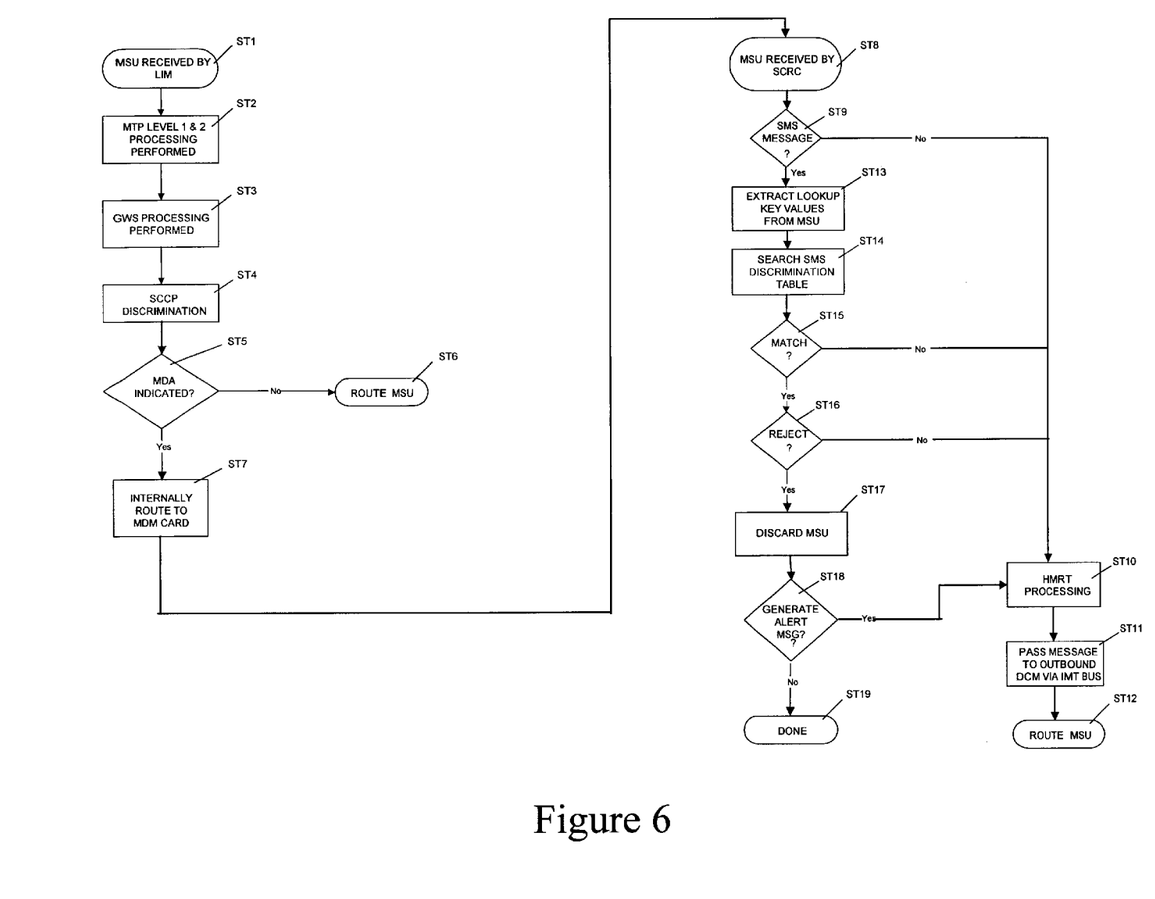
FIG. 6 is a flow chart illustrating exemplary steps performed by a routing node including an SMS message discrimination module according to an embodiment of the present invention.

FIG. 6 is a flow chart illustrating the steps associated with the SMS spam message discrimination by an SMS message discrimination module according to an embodiment of the present invention. For purposes of illustration, it is assumed that the SMS message being processed is an SS7-based SMS message. As discussed above, an SMS message discrimination application of the present invention may be practiced in a non-SS7 environment on SMS messages that utilize non-SS7 signaling protocols (e.g., SIP, SUA/SCTP, H.323, TALI, etc.). In any event, the block diagram presented in FIG. 5 may be used in conjunction with the processing flow chart of FIG. 6 to better understand SMS message discrimination application operation in an integrated routing node embodiment.

Beginning at inbound LIM 308, an SS7-based SMS signaling message is received (ST1) and SS7 MTP Level 1 and 2 processing is performed on the incoming signaling message packet by the MTP level 1 and 2 process 310, as indicated by step ST2. With MTP level 1 and 2 processing complete, the signaling message packet is temporarily buffered in I/O queue 312 before being passed up the stack to GWS process 314, where various parameters in message are examined to determine whether the message is to be allowed into the switch (ST3). Such GWS message screening parameters may include originating point code, destination point code, and carrier ID. Once the message successfully completes GWS processing, the message is directed to discrimination process 316, as indicated in step ST4. Discrimination process 316 examines the SMS signaling message packet and determines whether the packet requires processing by SG node 300. In one embodiment, discrimination process 316 examines destination point code and service indicator octet parameters contained within the message transfer part header of an SS7 signaling message packet. In the event that a signaling message includes a DPC value corresponding to the SS7 network address of the SG node and an SIO value corresponding to that of an SCCP type message, the message is identified as potentially requiring SMS message discrimination processing. In the example shown in FIG. 6, it is assumed that discrimination process 316 examines the DPC and SIO values associated with the received SMS signaling message and subsequently determines that message discrimination processing of the message packet may be required (ST5). If discrimination process 316 determines that a received message does not require SMS message discrimination processing, the message may be routed from SG node 300 via a communication module, such as a LIM or DCM (ST6). In the event that SMS message discrimination processing may be required, the SMS message is passed to the distribution process 318. Distribution process 318 internally distributes the SMS message from the receiving LIM 308 to MDM 340 via IMT bus 304, as indicated in step ST7.

In step ST8, the SMS signaling message arrives at MDM 340, and SCCP process 342 receives the packet. Within SCCP process 342, the message packet is passed to the SCRC controller 344. In step ST9, SCRC 344 decodes and examines packet content information contained within the SMS signaling message header in order to verify that the message is an SMS type message. In one embodiment, such a determination is made through examination of a subsystem (SSN) parameter that is contained in the SCCP portion of an SMS message. While different networks may define and recognize different SSN values to represent MAP type messages (SMS is a MAP type message), an SSN value typically used by wireless network operators to indicate a MAP type message is SSN=5. In another embodiment, the MDA function may examine the operation code in the MAP portion of the SMS message. For example, the SMS discrimination application may determine whether the operation code indicated that a received message is a ForwardShortMessage message. ForwardShortMessage messages are used to carry short messages in GSM networks. The MAP opcode can thus be used to select these messages for SMS discrimination processing while allowing other messages to pass.

In the event that a message is determined to be of a type other than SMS, the message is passed to routing application 350 for normal routing from SG node 300, as indicated by steps ST10, ST11 and ST12. However, if a message is determined to be an SMS message, data necessary to perform SMS message discrimination processing is next extracted from the message (ST13). In the sample implementation described herein, such data may include a CgPA parameter, a CdPA parameter, an OPC parameter, a DPC parameter, and/or a CID parameter, all of which correspond to key fields in the sample message discrimination table (Table 1) that resides on or is accessible by MDM 340. It should be noted that the MAP MSISDN, IMSI or MIN may be used, although they are not shown in the example table. As such, some or all of the data extracted from the SMS message is used to search the message discrimination table for a matching entry or record (ST14 and ST15). If a matching record or entry is not located, the message is passed to routing application 350 for routing from SG node 300, as indicated by steps ST10, ST11 and ST12.

In the event a matching entry is located in the SMS discrimination table, the data contained in the matching entry is used to perform SMS message discrimination processing. More particularly, an SMS discrimination action parameter value associated with the matching entry is examined to determine the appropriate message treatment (ST16). As described above, in one embodiment of the invention, the treatment options are defined as "allow" or "reject." In the event that a received SMS message matches the lookup key criteria associated with an entry that is provisioned to "reject" all matching SMS messages, the received SMS message is discarded (ST17). Information may be stored with each entry in Table 1 that indicates whether a new message is to be generated in response to the discarding of the SMS spam message (ST18). The new message may be an SMS message or another non-SMS message (e.g., TCAP, SIP, etc.) to alert the originator of the discarded spam SMS message that the discarded SMS message was not delivered to the intended recipient and that additional SMS messages should not be sent to the intended recipient. A new alert message may also be generated and delivered to a network operator, so as to assist the network operator in identifying the originator of the SMS spam traffic. If no alert message service is indicated then SMS discrimination processing is terminated (ST19).

If, however, a received SMS message matches the lookup key criteria associated with an entry that is provisioned to allow all matching SMS messages, the received SMS message is routed normally from SG 300. That is, the SMS message is passed to routing application 350 for routing from SG node 300, as indicated by steps ST10, ST 11 and ST12.

Figure 7:
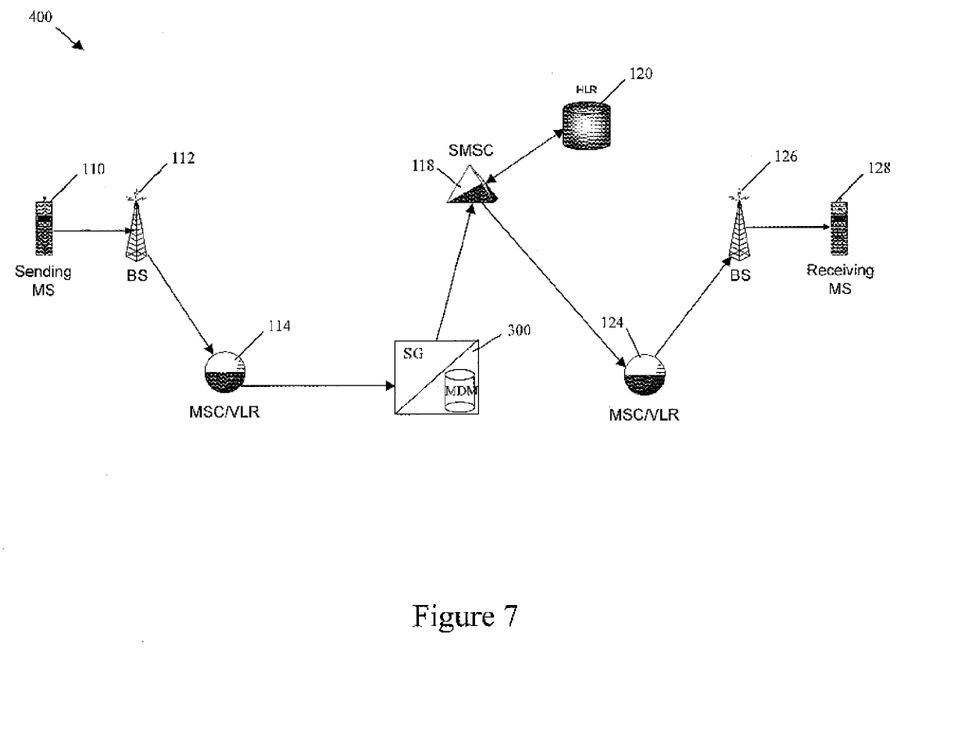
FIG. 7 is a network diagram is a network diagram including a routing node having an SMS message discrimination module according to an embodiment of the present invention.

FIG. 7 is a network diagram illustrating a wireless communications network including a signaling gateway 300 having an internal SMS message discrimination module according to an embodiment of the present invention. In FIG. 7, a mobile subscriber (MS) 110 may originate an SMS message destined for another mobile subscriber 128. The SMS message, addressed to MS 128, is received into the wireless network via base station system 112 and is subsequently routed to MSC 114. MSC 114 in turn routes the message to the signaling gateway 300. The SMS message is received by SG node 300 and is processed in a manner similar to that described above and generally illustrated in FIGS. 5 and 6.

In the event that the SMS message discrimination module within the SG node 300 determines that an unwanted or spam SMS message is being sent to MS 128, the SMS message is discarded and is consequently not delivered to the intended destination. Given the particular network architecture illustrated in this example, the discarding of the SMS message eliminates unnecessary SMS message traffic at two critical locations in the network. That is, an SMSC typically serves as an intermediate store and forward type buffer element for SMS messages in an SMS capable network. Consequently, all SMS messages destined for MS 128 would first be received, processed, and temporarily buffered by SMSC 118. Since spam SMS messages are discarded at SG 300, both the intermediate SMSC 118 and intended recipient MS 128 are shielded from unwanted SMS message traffic that would otherwise waste network resources. Eliminating such unwanted SMS traffic from an SMS capable network results in reduced processing demands on network resources (e.g., SMSC, HLR, and VLR nodes) and such load shedding is a key beneficial attribute of the present invention.

Stand-Alone SMS Message Discrimination Module Architecture

Figure 8:
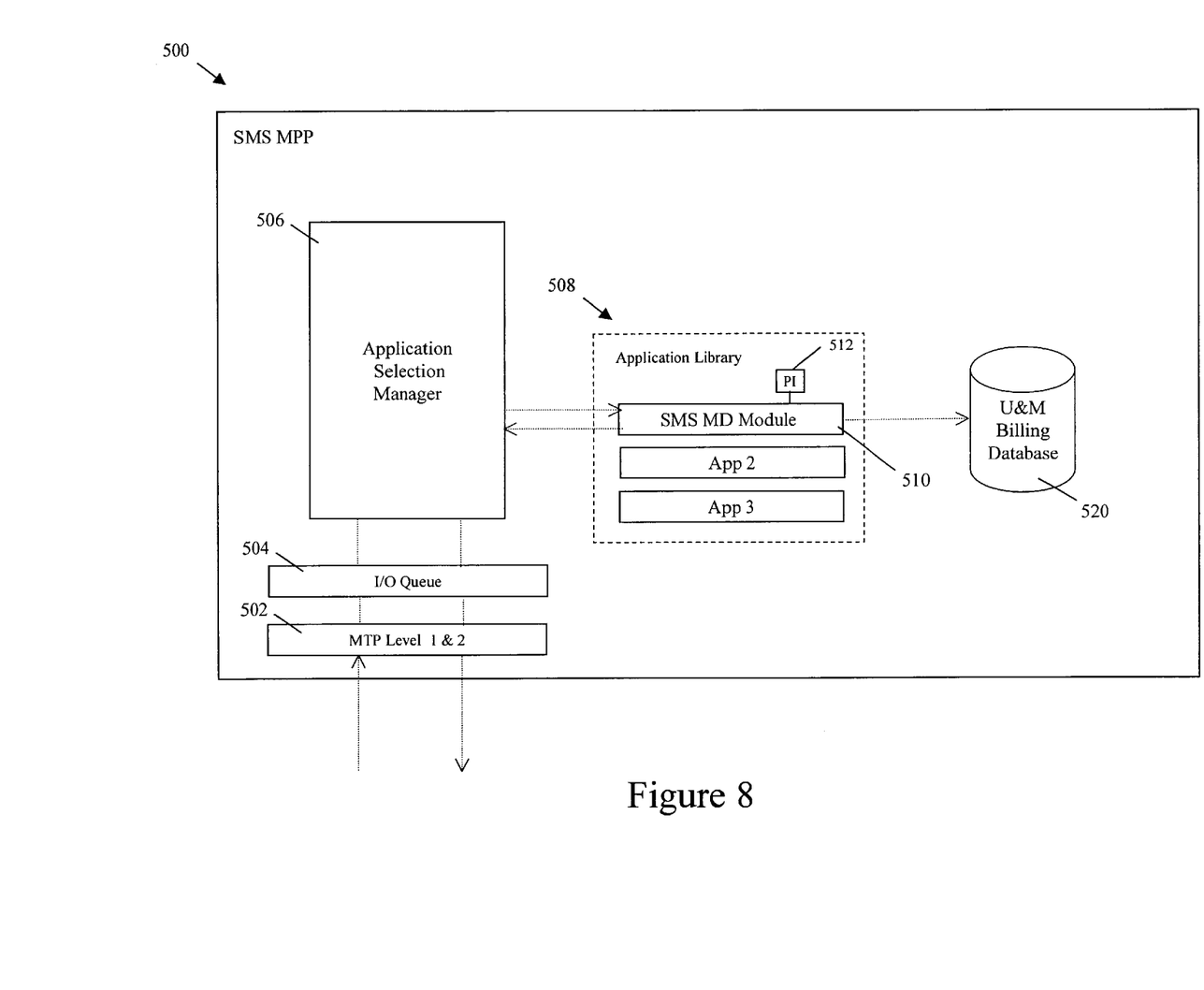
FIG. 8 is a block diagram illustrating a stand-alone message processing platform (MPP) including an SMS message discrimination module according to an embodiment of the present invention.

Yet another embodiment of the present invention involves the implementation of an SMS message discrimination module on a stand-alone processing platform that is not located within a routing node. A functional block diagram of a stand-alone message processing platform (MPP) 500 is shown in FIG. 8. In FIG. 8, MPP 500 includes SS7 and IP protocol stacks 502 and an I/O queue 504. MPP 500 further includes an application selection manager 506 and an application library 508. In this simplified example, application library 508 includes several message processing applications that receive and process a variety of signaling messages. For example, application library 508 may include an SMS message discrimination module 510 similar in function to the message discrimination application described above with respect to FIG. 5. In practice, such message processing applications may be implemented as sub-processes that reside within the application library 508, and include processing logic as well as tabular data. SMS message discrimination module 510 may include a provisioning interface 512 that allows a user to provision or change SMS message discrimination data. Provisioning interface 512 may be similar to provisioning interface 353 described with respect to FIG. 5. Hence, a description thereof will not be repeated herein.

Application selection manager 506 may access selection data to select the application for processing a received message. Table 3 shown below illustrates exemplary data that may be used by application selection manager 506.

TABLE 3

Application Selection Data

| | KEY (s) | | | | |
|---|---|---|---|---|---|
| Type | OPC | SLS | DPC | CID | APPLICATION |
| * | 1-1-1 | * | * | * | SMS MDM |
| IAM | * | * | * | 7 | App2 |
| IAM | * | * | 4-4-4 | * | App3 |

Although a variety of applications may be provisioned in Table 3, for purposes of explaining SMS message processing according to embodiments of the present invention, it is assumed that SMS message discrimination is the selected application.

A usage measurements/billing database 520 maintains usage metrics and billing information related to the screening and processing of SMS messages by the MPP 500. In one embodiment, UMB database 520 maintains information associated with screened or processed messages in the form of call detail records (CDRs). A simplified example of such call detail records is presented in Table 4.

TABLE 4

Usage Measurements and Billing Data

| KEY | | | BILLING RECORD DATA | | |
|---|---|---|---|---|---|
| Date | Time | Application | Recv. Pty | Sending Pty | Carrier |
| 12/01/2000 | 13:01:24 | SMS MD | 9194691300 | 9194671100 | 221 |
| 12/01/2000 | 13:01:26 | SMS MD | 9193457012 | joe@aol.com | 636 |
| 12/01/2000 | 13:01:34 | App2 | 9193457894 | 9194671230 | 221 |

Each row in Table 4 may represent a CDR. Each CDR illustrated in Table 4 includes date, time, and application type key fields. Each CDR also includes a called or receiving party identifier field that contains a phone number or similar identifier (e.g., email address, URL, etc.) associated with the SMS receiving party, a calling or sending party identifier field that contains the phone number or functionally similar identifier (e.g., email address, URL, etc.) associated with the SMS sending party, and a carrier ID field which contains the carrier ID associated with the SMS message. It will be appreciated that UMB database 520 may also be to collect and maintain peg count type usage measurements data and statistics associated with screened or processed SMS messages.

Stand-Alone SMS Message Discrimination Module Operation

Figure 9:
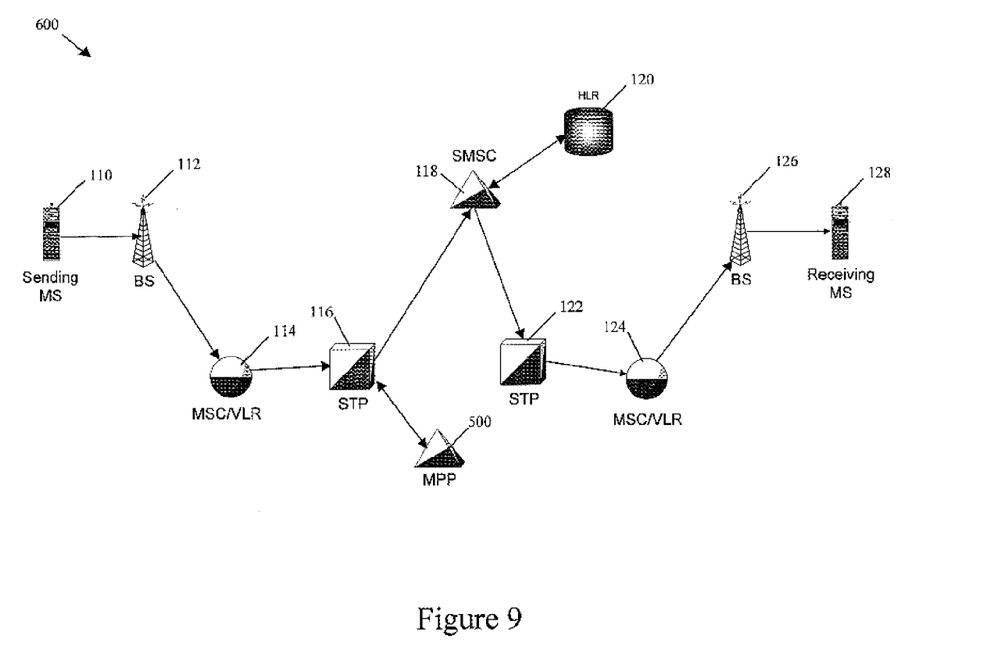
FIG. 9 is a network diagram including a stand-alone message processing platform having an SMS message discrimination module according to an embodiment of the present invention.

Focusing now on operation of a message processing platform (MPP) embodiment of the present invention, the path of a typical SS7 SMS signaling message requiring SMS message discrimination processing is traced through a sample communication network 600 shown in FIG. 9. The network 600 is similar in architecture to the communication network 100 previously illustrated in FIG. 1 and described herein. However, unlike network 100, communication network 600 includes the stand-alone message processing platform 500 that provides SMS message discrimination processing service.

As such, a mobile subscriber 110 may originate an SMS message destined for another mobile subscriber 128. The SMS message, addressed to MS 128, is received into the wireless network via base station system 112 and is subsequently routed to MSC 114. In this particular example, MSC 114 in turn routes the message to signal transfer point (STP) node 116. If the SMS message is addressed to an SS7 point code that is associated with STP 116, the SMS message is received by STP node 116 which performs a global title translation (GTT) or other functionally similar re-directing routing address translation operation. Those skilled in the art of SS7 communications will appreciate that GTT is a translation process used to determine the location (e.g., SS7 point code and subsystem) of a message processing platform (e.g., MPP, service control point, database node, etc.). Such GTT functionality is well known and widely deployed in modern communication networks. In any event, as a result of the GTT or GTT-like processing, the SMS message is routed from STP 116 to MPP 500 for MDA processing. At this point, it should be noted that it is also possible that an SMS message could be directly addressed to MPP node 500, in which case no GTT or GTT-like processing would be required by STP 116. In such a scenario, MPP node 500 would perform the necessary SMS message discrimination processing as well as any GTT or GTT-like processing required to route the message to SMSC 118.

In the particular embodiment shown in FIGS. 8 and 9, MPP 500 receives an SMS message packet via an SS7 communication link from STP 116. As such, lower level MTP process 502 is adapted to generally receive and process the SS7 message signaling unit. The SMS message is then passed via I/O queue 504 to the application selection manager 506. As discussed previously, ASM 506 is examines a number of message parameters and/or message characteristics for the purpose of determining the particular message processing application or applications that are required. The application selection data illustrated in Table 3 includes a number of index or key fields by which the table may be searched to determine the particular application that is required to service the received message. Again, it will be appreciated that these fields may be used alone or in combination as a search or lookup key.

In the example illustrated in FIG. 8, it is assumed that the originating point code (OPC) address information contained in the received SMS message is 1-1-1. Referring to the sample application selection data illustrated in Table 3, an OPC value of 1-1-1 indicates the need for SMS message discrimination processing. As such, the SMS message is passed from ASM 506 to SMS message discrimination application 510. SMS message discrimination processing then proceeds in a manner similar to the SMS message discrimination processing described above with respect to FIG. 5. That is, the SMS message discrimination module extracts data from one or more fields from the message and compares the extracted data to data stored in the SMS message discrimination table.

In the event that the SMS message discrimination module residing on MPP node 500 determines that MS 128 is being sent an unwanted or spam SMS message, the SMS message is discarded and is consequently not delivered to the intended destination. Once again, in such a case, discarding the SMS message eliminates unnecessary SMS message traffic at two critical locations in the network. That is, typically an SMSC serves as an intermediate store and forward type buffer element for SMS messages in an SMS capable network. Consequently, all SMS messages destined for MS 128 would first be received, processed, and temporarily buffered by SMSC 118. Since flood related SMS messages are discarded at SG 300, both the intermediate SMSC 118 and the intended recipient MS 128 are shielded from unwanted or spam SMS message traffic that would be otherwise be wasteful of network resources. Once again, it will be appreciated that elimination of such unwanted SMS traffic from an SMS capable network results in reduced processing demands on network resources (e.g., SMSCs, HLRS, and VLRS) and such overload protection is a key advantage of the present invention.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for identifying and processing unwanted short message service (SMS) messages, the method comprising:

(a) receiving, at a telecommunications signaling message routing node for routing telecommunications signaling messages between telecommunications signaling nodes of a telecommunications signaling network, a first SMS message including sending an receiving party identification information;

(b) performing a lookup in an SMS message discrimination (MD) database at the telecommunications signaling message routing node using at least one of the sending and receiving party identification information to determine whether the SMS message is an unwanted message; and (c) in response to determining that the first SMS message is an unwanted message, discarding the first SMS message.

2. The method of claim 1 wherein receiving a first SMS message includes receiving a signaling system 7 (SS7) mobile application part (MAP)-based SMS message.

3. The method of claim 2 wherein receiving an SS7 MAP-based SMS message includes receiving an Internet protocol (IP)-encapsulated SS7 MAP-based SMS message.

4. The method of claim 1 wherein receiving a first SMS message includes receiving a session initiation protocol (SIP)-based SMS message.

5. The method of claim 1 wherein receiving a firs SMS message including sending and receiving party information includes receiving a first SMS message including a mobile subscriber integrated services digital network (MSISDN) number and wherein performing a lookup in the message discrimination database includes performing a lookup based on the MSISDN number.

6. The method of claim 1 wherein receiving a first SMS message including sending and receiving party information includes receiving an SMS message including an international mobile station identifier (IMSI) number and wherein performing a lookup in the SMS message discrimination database includes performing a lookup based on the IMSI number.

7. The method of claim 1 wherein receiving a first SMS message that contains sending and receiving party information includes receiving an SMS signaling message including an electronic mail (email) address and wherein performing a lookup in the SMS message discrimination database includes performing a lookup based on the email address.

8. The method of claim 1 wherein receiving a first SMS message including sending and receiving party information includes receiving an SMS signaling message that contains an Internet protocol (IP) address and wherein performing a lookup in the SMS message discrimination database includes performing a lookup based on the IP address.

9. The method of claim 1 including in response to determining that the first SMS message is an unwanted message, generating a second SMS message addressed to a sending party.

10. The method of claim 9 wherein the second SMS message notifies the sending party that the first SMS message was blocked by the receiving party.

11. The method of claim 1 including, in response to determining that the first SMS message is an unwanted message, generating second SMS message addressed to a third party.

12. The method of claim 11 wherein the second SMS message notifies the third party that unwanted SMS messages are being sent from a sending party to a receiving party.

13. The method of claim 12 wherein the third party is a network operator or carrier.

14. The method of claim 12 wherein the third party is a government agency.

15. The method of claim 1 including in response to determining that the first SMS message is an unwanted message, updating information in a usage measurements and billing (UMB) database to account for the discarded SMS message.

16. The method of claim 15 including generating bill based on information stored in the UMB database.

17. The method of claim 15 including generating a billing cerification report based on information stored in the UMB database.

18. The method of claim 15 including generating a report using data in the UMB database indicating the number of discarded SMS messages associated with or sent by a sending party.

19. The method of claim 1 wherein the telecommunications signaling message routing node comprises an SS7/IP gateway.

20. The method of claim 1 wherein the telecommunications signaling message routing node comprises an STP.

21. A method for processing short message service (SMS) messages, the method comprising:
   (a) allowing a user to provision SMS message discrimination data in an SMS message discrimination table at a telecommunications signaling message routing node for routing telecommunications signaling messages between telecommunications signaling nodes of a telecommunications signaling network;
   (b) at the telecommunications signaling message routing node, receiving SMS messages from a network;
   (c) extracting parameters from the SMS messages using SMS message decoding logic at the telecommunications signaling message routing node;
   (d) performing a lookup in the SMS message discrimination table using the extracted parameters; and
   (e) identifying wanted and unwanted SMS messages base on the SMS message discrimination data provisioned by the user using SMS message discrimination logic at the telecommunications signaling message routing node.

22. The method of claim 21 wherein allowing a user to provision SMS message discrimination data includes allowing the user to input receiving-party-based SMS message discrimination data in the SMS message discrimination table.

23. The method of claim 22 wherein allowing the user to input receiving-party-based SMS message discrimination data in the SMS message discrimination table includes allowing the user to input receiving mobile subscriber identification information in the SMS message discrimination table.

24. The method of claim 22 wherein allowing the user to input receiving-party-based SMS message discrimination data in the SMS message discrimination table includes allowing the user to input receiving network identification information in the SMS message discrimination table.

25. The method of claim 21 wherein allowing a user to provision SMS message SMS message discrimination data includes allowing the user to input sending-party-based discrimination data in the SMS messag discrimination table.

26. The method of claim 25 wherein allowing the user to input sending-party-based SMS message discrimination data in the SMS message discrimination table includes allowing the user to input sending mobile subscriber identification information in the SMS message discrimination table.

27. The method of claim 25 wherein allowing the user to input sending-party-based SMS message discrimination data in the SMS message discrimination table includes allowing the user to input sending network identification information in the SMS message discrimination table.

28. The method of claim 21 wherein allowing a user to provision SMS message discrimination data includes allowing the user to input sending-and receiving-party-based discrimination data in the SMS message discrimination table.

29. The method of claim 28 wherein allowing the user to input sending-and receiving-party-based SMS message discrimination data in the SMS message discrimination table includes allowing the user to input sending and receiving mobile subscriber identification information in the SMS message discrimination table.

30. The method of claim 28 wherein allowing the user to input sending-and receiving-party-based SMS message discrimination data in the SMS message discrimination table includes allowing the user to input sending and receiving network identification information in the SMS message discrimination table.

31. The method of claim 21 wherein the user comprises a mobile subscriber.

32. The method of claim 21 wherein the user comprises a network operator.

33. The method of claim 21 comprising discarding the unwanted SMS messages.

34. The method of claim 33 comprising generating and sending SMS discard notification messages to calling parties in response discarding the unwanted SMS messages.

35. The method of claim 33 comprising counting unwanted SMS messages received from a particular calling party and when the count exceeds a threshold, sending a notification message to an enforcement agency.

36. The method of claim 21 comprising routing the wanted SMS messages to intended recipients.

37. The method of claim 21 wherein the telecommunications signaling message routing node comprises an SS7/IP gateway.

38. The method of claim 21 wherein the telecommunications signaling message routing node comprises an STP.

39. A telecommunications signaling message routing node for routing telecommunications signaling messages between telecommunications signaling nodes in a telecommunications signaling network and for preventing the delivery of unwanted short message service (SMS) signaling messages to a receiving party, the telecommunications signaling message routing node comprising:
   (a) a communications module at the telecommunications signaling message routing node for sending and receiving SMS messages;
   (b) an SMS message discrimination module at the telecommunications signaling message routing node for analyzing SMS messages received by the communications module and determining whether the SMS messages comprise unwanted messages; and (c) an SMS message discrimination database at the telecommunications signaling message routing node and containing data used by the SMS discrimination module to determine whether the receive SMS messages are unwanted messages.

40. The telecommunications signaling message routing node of claim 39 wherein the communications module, the SMS discrimination module, and the SMS discrimination function are components of a signal transfer point (STP).

41. The telecommunications signaling message routing node of claim 39 wherein the communications module, the SMS discrimination module, and the SMS discrimination function are components of a signaling gateway (SG).

42. The telecommunications signaling message routing node of claim 39 wherein the communications module comprises a signaling system 7 (SS7) link interface module (LIM).

43. The telecommunications signaling message routing node of claim 39 wherein the communications module comprises an Internet protocol (IP) data communications module (DCM).

44. The telecommunications signaling message routing node of claim 39 wherein the SMS message discrimination module is adapted to extract SCCP parameters from the SMS messages to determine whether the SMS messages are unwanted messages.

45. The telecommunications signaling message routing node of claim 39 wherein the SMS message discrimination module is adapted to extract MAP parameters from the SMS messages to determine whether the SMS messages are unwanted messages.

46. The telecommunications signaling message routing node of claim 39 wherein the SMS message discrimination module is adapted to extract SIP parameters from the SMS messages to determine whether the SMS messages are unwanted messages.

47. The telecommunications signaling message routing node of claim 39 wherein the SMS message discrimination module is adapted to discard the unwanted SMS messages.

48. The telecommunications signaling message routing node of claim 47 wherein the SMS message discrimination module is adapted to notify a sending party when an SMS message is discarded.

49. The telecommunications signaling message routing node of claim 47 wherein the SMS message discrimination module is adapted to notify a third party when an SMS message is discarded.

50. The telecommunications signaling message routing node of claim 39 including a usage measurements and billing database for maintaining statistics, generating usage reports, and generating bills associated with SMS messages processed by the SMS message discrimination module.

51. The telecommunications signaling message routing node of claim 39 comprising a provisioning interface for allowing a user to provision SMS message discrimination data in the SMS discrimination database.

52. A signaling messaae routing node for preventing the delivery of unwanted short message service (SMS) signaling messages to a receiving party, the signaling message routing node comprising:

(a) a communications module at the signaling message routing node for sending and receiving SMS messages;

(b) an SMS message discrimination module for anal using SMS messages received by the communications module and determinig whether the SMS messages comprise unwanted messages;

(c) an SMS message discrimination database at the signaling message routing node containing data used by the SMS discrimination module to determine whether the received SMS messages are unwanted messages; and (d) a stand-alone message processing platform (MPP) and a signal transfer point coupled to the MPP, wherein the SMS message discrimination module and the SMS message discrimination database are resident on the MPP and wherein the communications module is resident on the signal transfer point.

\* \* \* \* \*